United States Patent Office 3,488,739
Patented Jan. 6, 1970

3,488,739
PREPARATION OF METHYL MERCAPTAN
AND DIMETHYL SULFIDE
John J. van Venrooy, Media, Pa., assignor to Sun Oil
Company, Philadelphia, Pa., a corporation of New
Jersey
No Drawing. Filed Feb. 27, 1967, Ser. No. 619,005
Int. Cl. C07c 149/06, 149/10
U.S. Cl. 260—609                                    6 Claims

ABSTRACT OF THE DISCLOSURE

A process for the preparation of methyl mercaptan and/or dimethyl sulfide by passing carbon disulfide and excess hydrogen over a sulfactive hydrogenation catalyst at a temperature in the range of about 250° to 500° F., preferably at about 325 to 425° F. The sulfactive hydrogenation catalysts are sulfides of members of Groups VI and VIII metals such as cobalt, nickel, or molybdenum. The amount of dimethyl sulfide product is reduced and the amount of methyl mercaptan product is increased by recycling the dimethyl sulfide. Alternatively the amount of dimethyl sulfide is increased and the amount of methyl mercaptan is reduced by recycling the methyl mercaptan.

The invention relates to the preparation of methyl mercaptan and dimethyl sulfide. More particularly this invention involves the preparation of either methyl mercaptan or dimethyl sulfide or both in high yields by the reaction of hydrogen and carbon disulfide over a metal sulfide catalyst.

BACKGROUND OF THE INVENTION

Various methods have been used from time to time for the preparation of mercaptans. Many have involved expensive reactants and/or complex recovery procedures in order to carry them out. To be more specific, prior methods have involved: the reaction of an alkali sulfate or alkyl halide with sodium or potassium hydrosulfide; passing hydrogen sulfide and vaporized alcohol through a hot tube over a catalyst such as thoria; adding hydrogen sulfide to an unsaturate and in order to obtain a primary mercaptan contrary to Markovnikov's rule, ultra violet light or a peroxide is used. Sometimes thioacetic acid is used in the place of hydrogen sulfide in the reaction with unsaturates. However, in that case, the product of the thioacetic acid and the unsaturate must be finally reacted with an alcohol to produce the mercaptan. Still other methods have involved the reductive thiolation of aldehydes, ketones, or nitriles in the presence of sulfactive hydrogenation catalysts.

It would be commendable if a method were available which employed relatively cheap and commercially available starting materials but even more importantly a convenient, simple and facile procedure involving more or less simple reactants and by-products which are easy to handle and do not require any regeneration or conversion of by-products, a complex or difficult separation and recovery procedure. In addition it would also be commendable if the foregoing could be achieved in relatively simple and inexpensive equipment. A process wherein the foregoing is accomplished, the yields are quantitative so that substantially no by-products are produced, and the process is readily amenable to continuous operation is highly desirable. The present invention provides such a process but in addition possesses considerable flexibility in regard to product.

SUMMARY OF THE INVENTION

The present invention in brief and broad respect comprises passing $CS_2$ and an excess of hydrogen in the gaseous or vapor state over a sulfactive hydrogenation catalyst at a temperature in the range of about 250° to 500° F. and a pressure varying from about atmospheric to about 1000 p.s.i. to prepare methyl mercaptan and/or dimethyl sulfide with $H_2S$, methyl mercaptan is produced at the expense of dimethyl sulfide. By recycling methyl mercaptan, dimethyl sulfide is produced at the expense of the methyl mercaptan. The relative amounts of the primary products can be accordingly controlled to a high degree.

DETAILED DESCRIPTION OF THE INVENTION

By sulfactive hydrogenation catalyst, it is meant the sulfides of Group VI and Group VIII metals either alone or in combination. For example, the sulfides of cobalt, nickel, molybdenum, iron, tungsten, chromium, platinum, etc. Usually the catalytic material is deposited on a support such as activated carbon, alumina, zirconia, thoria, pumice, silica and silica-aluminum compositions. Combinations of nickel or cobalt with molybdenum are generally among the most preferred of such catalysts. Quite effective catalysts of the foregoing preferred combinations but in the oxide form are available commercially. One such catalyst is available under the designation Aero HDS-3A. Aero HDS-3A comprises NiO (3 wt. percent), $MoO_3$ (15 wt. percent), and small amounts of $Na_2$ (about 0.02%) and phosphorus (about 1.5%), the remainder being alumina. It is easily sulfided using well-known and conventional sulfiding conditions, conventional techniques and equipment. For example, using $H_2S$ and hydrogen at about 350° to 650° F. and pressures of about atmospheric to 300 p.s.i.

By excess hydrogen it is meant in excess of stoichiometric amounts where 3 moles of hydrogen per mole of $CS_2$ are required for the formation of a mixture of $CH_3SH$ and $CH_3$—S—$CH_3$. When greater than a 3/1 ratio of hydrogen to $CS_2$, for example, a ratio of 10/1, is used an excess of hydrogen will be attained. Generally as a practical matter about a 3/1 to 10/1 ratio will be employed although greater or less amounts can be used.

Although the exact mechanism is not known with certainty it is believed that the reduction of $CS_2$ to a mixture of $CH_3SH$ and $CH_3$—S—$CH_3$ occurs in a sequence of reaction steps. It is to be understood that the mechanisms and discussion relative thereto hereinbelow are believed to be correct, however, applicant is not bound thereby but only by the actual process features as set forth in the appended claims.

(1) $\quad CS_2 + 2H_2 \rightarrow [HS—CH_2—SH]$ (2) $\quad [HS—CH_2—SH] \rightarrow [CH_2S] + H_2S$ (3) $\quad [CH_2S] + H_2 \rightarrow CH_3SH$ (4) $\quad 2CH_3SH \rightarrow CH_3—S—CH_3 + H_2S$ The intermediate compounds shown in brackets have not been isolated and identified but are believed to be theoretically reasonable precursors to the formation of $CH_3SH$ and $CH_3$—S—$CH_3$. More drastic operating conditions would of course lead to further hydrogenation taking place to yield methane which is undesirable.

(5) $\quad CH_3SH + H_2 \rightarrow CH_4 + H_2S$ (6) $\quad CH_3—S—CH_3 + 2H_2 \rightarrow 2CH_4 + H_2S$ It should be recognized that reaction step 4 shown above is a reversible catalyzed disproportionation which permits the control of the relative amounts of $CH_3$—S—$CH_3$ and $CH_3SH$ being formed.

The pressure is not critical and thus atmospheric pressure, to the extent that it is more convenient to employ and more economical by reason of the lower costs of the simpler equipment and operating expenses of same, is to be preferred. Pressures as high as about 1000 p.s.i., however, can be employed with certain advantages accruing in specific circumstances. Pressure and temperature vary inversely and accordingly the temperature limits set forth herein are lowered by the use of substantial pressure.

The most critical feature is the temperature. In fact the temperature is highly critical. From a practical standpoint the broadest temperature range suitable especially with a nickel sulfide-molybdenum sulfide catalyst is about 275 to 450° F. However, it should be noted that within this broad temperature range there is a narrow highly critical and preferred temperature range of about 325 to 425° F. The criticality of the temperature parameter can best be fully appreciated by reference to a graphical representation of the variation in temperature versus the consequential variation in yield of methyl mercaptan and dimethyl sulfide. Such graphical representation is as follows:

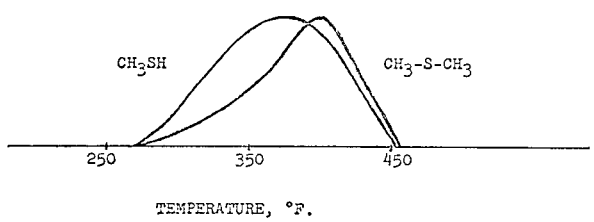

From the sharpness of the yield peaks in the graph it can be seen that the reaction is quite sensitive in respect to the temperature. As briefly indicated hereinabove either the methyl mercaptan or dimethyl sulfide can be recycled practically to extinction with a consequential increase in the other one. Without recycle they are produced in approximately the same amounts, at least at optimum temperatures. About the only other products are $H_2S$ and methane in very small amounts. This is very surprising when all of the possible reactions are considered. For one thing, the compounds prepared by this process are intermediates to other products, for example, $CH_4$, but other than $CH_3SH$, $CH_3$—S—$CH_3$ and $H_2S$ no additional products are found except in negligible amounts.

To facilitate the understanding of the invention, certain details and illustrative embodiments will now be set forth; however, of course, it is to be fully understood and appreciated that the invention is not limited to the specific conditions or details set forth in these examples, since the process is capable of many modifications and variations and conditions, such modifications and variations being aided, suggested, or indicated by the discussion of the process as found herein and the discussions of the trends of the effect of the various factors.

EXAMPLE 1

Catalyst preparation

A tubular glass reactor mounted vertically and provided with an external electrical heating jacket was loaded with 73.3 gms. of Aero HDS–3A catalyst described hereinabove. The bed of catalyst was heated under flowing nitrogen to 350° F. The nitrogen flow was stopped and a mixture of $H_2$ and $H_2S$ in a 6:1 ratio and flowing at the rate of 70 cc. per minute was admitted to the top of catalyst bed. This sulfiding mixture upon contacting the catalyst pellets turned them from pale yellow to black in color. Continued feeding of the sulfiding gas mixture to the bed of catalyst gradually turned the entire bed black. During the sulfiding process the temperature of the bed was gradually raised from 350 to 550° F. The sulfiding was continued until the composition of the exit gas from the bottom of the reactor was the same as the composition of the feed mixture thereby indicating that no additional sulfiding was taking place.

Preparation of $CH_3SH$ and $CH_3$—S—$CH_3$

The sulfided catalyst prepared above was used for the hydrogenation of $CS_2$. The temperature of the bed was set at 400° F. and a stream of $H_2$ amounting to 75 cc. per minute and a stream of $CS_2$ vapor amounting to 7.2 cc. per minute were admitted to the top of the bed. The effluent gas from the bottom of the catalyst bed was analyzed by vapor phase chromatography and was found to contain only a trace of unreacted $CS_2$ thereby indicating essentially complete utilization of the $CS_2$ in the feed. The major hydrogenation products of the $CS_2$ were $CH_3SH$ and $CH_3$—S—$CH_3$ in approximately equal amounts thereby indicating that one-third of the $CS_2$ in the feed yielded $CH_3SH$ and two-thirds yielded $CH_3$—S—$CH_3$. Only a minor amount of $CH_4$ was found to be present in the reactor effluent gas thereby indicating good control of the hydrogenation process.

EXAMPLE II

Example I was repeated except that the bed of catalyst was maintained at 350° F. At this operating temperature it was found that 76.4% of the $CS_2$ was reduced with not even a trace of $CH_4$ being formed. The major products were $CH_3SH$ and $CH_3$—S—$CH_3$ which were formed in an approximately 2:1 ratio thereby indicating that one-half of the $CS_2$ that was hydrogenated was converted to $CH_3SH$ and one-half to $CH_3$—S—$CH_3$.

EXAMPLE III

The sulfided catalyst bed prepared in Example I was used to carry out the disproportionation of $CH_3SH$ to $CH_3$—S—$CH_3$. The temperature of the catalyst bed was set 400° F. A mixture of $H_2$ and $CH_3SH$ flowing at the rate of 134 cc. per minute and containing 32.8 volume percent $CH_3SH$ was fed to the top of the catalyst bed. The effluent gas from the bottom of the bed after reaching equilibrium was analyzed by vapor phase chromatography and was found to contain $CH_3$—S—$CH_3$ as a major product. Of the $CH_3SH$ fed to the reactor 40.3% was converted to $CH_3$—S—$CH_3$ and $H_2S$ and 6.0% was converted to $CH_4$ and $H_2S$. This result indicates the facile disproportionation of $CH_3SH$ to $CH_3$—S—$CH_3$.

What is claimed is:

1. A process for preparing methyl mercaptan and dimethyl sulfide which comprises passing carbon disulfide and excess hydrogen in the range of at least about 3:1 to 10:1 on a mole ratio basis over a sulfactive hydrogenation catalyst consisting essentially of a combination of nickel and molybdenum sulfides prepared by sulfiding a nickel oxide and molybdenum oxide on alumina catalyst wherein the nickel oxide is present in about 3 weight percent and the molybdenum oxide is present as $MoO_3$ in about 15 weight percent, at a temperature in the range of about 275° to 450° F.

2. A process according to claim 1 wherein the temperature is in the range of about 325° to 425° F.

3. A process according to claim 2 wherein all of the methyl mercaptan is recycled to the reaction zone.

4. A process according to claim 2 wherein all the dimethyl sulfide and at least a stoichiometric amount of the hydrogen sulfide is recycled to the reaction zone.

5. A process comprising reacting carbon disulfide and excess hydrogen in the range of about 3 to 10 moles of hydrogen per mole of carbon disulfide at a temperature in the range of about 325° to 425° F. in the presence of a sulfactive hydrogenation catalyst comprising nickel sulfide and molybdenum sulfide prepared by sulfiding a nickel oxide and molybdenum oxide on alumina catalyst wherein the nickel oxide is present in about 3 weight percent and the molybdenum oxide is present as $MoO_3$ in about 15 weight percent, to form a reaction product comprising methyl mercaptan and dimethyl sulfide.

6. A process according to claim 5 wherein methyl mercaptan or dimethyl sulfide is recycled to vary the relative amounts of same in the product.

References Cited

Fischer Chem. Abstracts, vol. 32 (1938), pp. 9437–9438.
Ivanovskii, Chem. Abstracts, vol. 51 (1957), p. 7819.
Ivanovskii, Chem. Abstracts, vol. 54 (1960), p. 21965.

CHARLES B. PARKER, Primary Examiner

D. R. PHILLIPS, Assistant Examiner

U.S. Cl. X.R.

260—607